United States Patent
Liu et al.

(10) Patent No.: US 11,580,664 B2
(45) Date of Patent: Feb. 14, 2023

(54) DEEP LEARNING-BASED METHOD AND DEVICE FOR CALCULATING OVERHANG OF BATTERY

(71) Applicant: Wuxi Unicomp Technology Co., Ltd., Wuxi (CN)

(72) Inventors: Jun Liu, Wuxi (CN); Qing Yu, Wuxi (CN); Yanqing Yang, Wuxi (CN); Hua'an Xu, Wuxi (CN)

(73) Assignee: WUXI UNICOMP TECHNOLOGY CO., LTD., Wuxi (CN)

( * ) Notice: Subject to any disclaimer, the term of this patent is extended or adjusted under 35 U.S.C. 154(b) by 166 days.

(21) Appl. No.: 17/214,914

(22) Filed: Mar. 28, 2021

(65) Prior Publication Data
US 2022/0198698 A1    Jun. 23, 2022

(30) Foreign Application Priority Data
Dec. 17, 2020 (CN) .......................... 202011492910.8

(51) Int. Cl.
| | |
|---|---|
| G06T 7/73 | (2017.01) |
| G06K 9/62 | (2022.01) |
| G06N 3/08 | (2006.01) |
| G06T 7/00 | (2017.01) |
| G06T 7/11 | (2017.01) |

(52) U.S. Cl.
CPC .............. *G06T 7/73* (2017.01); *G06K 9/6256* (2013.01); *G06N 3/08* (2013.01); *G06T 7/0004* (2013.01); *G06T 7/11* (2017.01); *G06T 2207/10116* (2013.01); *G06T 2207/20081* (2013.01); *G06T 2207/20084* (2013.01); *G06T 2207/30108* (2013.01)

(58) Field of Classification Search
CPC . G06T 7/73; G06T 7/0004; G06T 7/11; G06T 2207/10116; G06T 2207/20081; G06T 2207/20084; G06T 2207/30108; G06T 2207/30164; G06T 7/12; G06K 9/6256; G06N 3/08; G06V 10/82; G06V 20/50
See application file for complete search history.

(56) References Cited

U.S. PATENT DOCUMENTS

| | | | |
|---|---|---|---|
| 2019/0102604 A1* | 4/2019 | Chang | G06K 9/627 |
| 2021/0209739 A1* | 7/2021 | Wen | G06T 7/001 |
| 2022/0351004 A1* | 11/2022 | Kanter | G06N 20/00 |

* cited by examiner

*Primary Examiner* — Bobbak Safaipour
(74) *Attorney, Agent, or Firm* — Bayramoglu Law Offices LLC

(57) ABSTRACT

A deep learning-based method for calculating an overhang of a battery includes the following steps: obtaining a training sample image set; training a neural network according to the training sample image set to obtain a segmentation network model; detecting an object detection image of the battery to be detected according to the segmentation network model to obtain a corresponding first binarized image; obtaining top coordinates of each of a positive electrode and a negative electrode of the battery to be detected according to the first binarized image; and calculating the overhang of the battery to be detected according to the top coordinates.

13 Claims, 1 Drawing Sheet

DEEP LEARNING-BASED METHOD AND DEVICE FOR CALCULATING OVERHANG OF BATTERY

CROSS REFERENCE TO THE RELATED APPLICATIONS

This application is based upon and claims priority to Chinese Patent Application No. 202011492910.8, filed on Dec. 17, 2020, the entire contents of which are incorporated herein by reference.

TECHNICAL FIELD

The present invention relates to the technical field of object detection, and more particularly, to a deep learning-based method and device for calculating an overhang of a battery.

BACKGROUND

The overhang of a battery refers to the portion of the negative electrode that extends past the positive electrode in the length direction and the width direction. This is what is called the overhang (alignment) design of batteries. Since the electrochemical performance of batteries is sensitive to an overhang, a battery having a completely overlapped positive electrode and negative electrode without the overhang can attain optimal performance, but such batteries cannot be fabricated due to the restricted engineering accuracy. The battery designed with an overhang is thus prone to lithium plating. In this regard, it is necessary to control the overhang of batteries within an appropriate range in engineering in order to ensure the performance of the battery.

In the prior art, the overhang of a battery is typically calculated by using X-ray images of the battery. This method, however, has certain limitations such as low versatility, the complexity of calculation, and low calculation accuracy.

SUMMARY

In order to solve the above-mentioned technical problems, the present invention provides a deep learning-based method for calculating an overhang of a battery, which not only greatly simplifies the calculation method, but also has high calculation accuracy and versatility.

The present invention adopts the following technical solutions.

A deep learning-based method for calculating an overhang of a battery includes the following steps: obtaining a training sample image set; training a neural network according to the training sample image set to obtain a segmentation network model; detecting an object detection image of the battery to be detected according to the segmentation network model to obtain a corresponding first binarized image; obtaining top coordinates of each of a positive electrode and a negative electrode of the battery to be detected according to the first binarized image; and calculating the overhang of the battery to be detected according to the top coordinates.

The step of obtaining the training sample image set includes: photographing the battery by using X-rays to obtain a training sample image; labeling the positive electrode and the negative electrode of the battery in the training sample image to obtain a labeled image; and generating the training sample image set according to the training sample image and the corresponding labeled image.

The step of training the neural network according to the training sample image set to obtain the segmentation network model includes: scaling the training sample image to a preset size; and training, according to the scaled training sample image, the neural network by using a gradient descent method to obtain the segmentation network model.

The step of training the neural network according to the training sample image set to obtain the segmentation network model further includes: detecting the training sample image according to the segmentation network model to obtain a corresponding second binarized image; comparing the second binarized image with the labeled image; and correcting the segmentation network model according to the comparison result.

A deep learning-based device for calculating an overhang of a battery includes a first acquisition module, a second acquisition module, a detection module, a third acquisition module, and a calculation module. The first acquisition module is configured to obtain a training sample image set. The second acquisition module is configured to train a neural network according to the training sample image set to obtain a segmentation network model. The detection module is configured to detect an object detection image of the battery to be detected according to the segmentation network model to obtain a corresponding first binarized image. The third acquisition module is configured to obtain top coordinates of each of a positive electrode and a negative electrode of the battery to be detected according to the first binarized image. The calculation module is configured to calculate the overhang of the battery to be detected according to the top coordinates.

A computer device includes a memory, a processor, and a computer program stored in the memory and configured to run on the processor. The processor executes the computer program to implement the deep learning-based method for calculating the overhang of the battery described above.

A non-transitory computer-readable storage medium is provided, and a computer program is stored in the non-transitory computer-readable storage medium. The program is executed by a processor to implement the deep learning-based method for calculating the overhang of the battery described above.

The advantages of the present invention are as follows.

The present invention not only greatly simplifies the calculation method, but also has high calculation accuracy and versatility.

DETAILED DESCRIPTION OF THE EMBODIMENTS

The technical solutions in the embodiments of the present invention will be clearly and completely described with reference to the drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative efforts shall fall within the scope of protection of the present invention.

FIG. 1 is a flow chart of a deep learning-based method for calculating an overhang of a battery according to an embodiment of the present invention.

Figure 1:
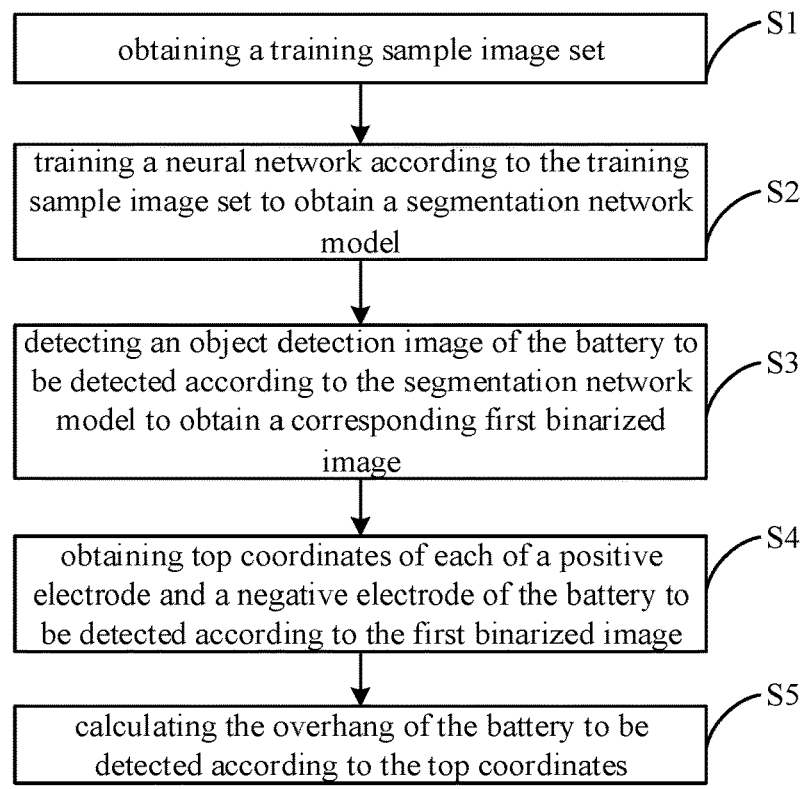
FIG. 1 is a flow chart of a deep learning-based method for calculating an overhang of a battery according to an embodiment of the present invention.

As shown in FIG. 1, a deep learning-based method for calculating an overhang of a battery includes the following steps:

S1, a training sample image set is obtained.

According to an embodiment of the present invention, the step of obtaining the training sample image set includes: photographing the battery by using X-rays to obtain a training sample image; labeling the positive electrode and the negative electrode of the battery in the training sample image to obtain a labeled image; and generating the training sample image set according to the training sample image and the corresponding labeled image.

Specifically, the battery is photographed by using X-rays (for example, emitted by X-ray equipment) to obtain the training sample image. The positive electrode and the negative electrode of the battery in the training sample image are labeled according to the characteristics of the battery to obtain the labeled image. The labeled image includes a binarized image of the positive electrode and a binarized image of the negative electrode. In order to facilitate processing, the binarized image of the positive electrode and the binarized image of the negative electrode of the battery and a background image (black background image) are combined into a three-channel image.

The training sample image and the corresponding labeled image, after being obtained, jointly serve as the training sample image set.

S2, a neural network is trained according to the training sample image set to obtain a segmentation network model.

According to an embodiment of the present invention, the step of training the neural network according to the training sample image set to obtain the segmentation network model includes: scaling the training sample image to a preset size; and training, according to the scaled training sample image, the neural network by using a gradient descent method to obtain the segmentation network model.

Specifically, after the training sample image set is obtained by using the above approach, the training sample image in the training sample image set is first scaled to a preset size, and the scaled training sample image has the same size as the labeled image. Then, the neural network is trained according to the scaled training sample image by using the gradient descent method to obtain the segmentation network model. The neural network is a U-Net or other image generation/image-to-image translation network.

Based on the foregoing embodiment, in practical applications, in order to improve the accuracy of detection, the segmentation network model, after being obtained, is corrected to ensure the accuracy of the segmentation network model.

Specifically, according to an embodiment of the present invention, the step of training the neural network according to the training sample image set to obtain the segmentation network model further includes: detecting the training sample image according to the segmentation network model to obtain the corresponding second binarized image; comparing the second binarized image with the labeled image; and correcting the segmentation network model according to the comparison result.

Specifically, after the segmentation network model is obtained, the training sample image is detected through the segmentation network model to generate the corresponding second binarized image, that is, to obtain the binarized image of the positive electrode and the binarized image of the negative electrode of the battery corresponding to the training sample image, and the second binarized image is compared with the labeled image. If the second binarized image matches the labeled image, it indicates that the segmentation network model has a relatively high detection accuracy and thus does not need to be corrected. If the second binarized image does not match the labeled image, it indicates that the segmentation network model has a relatively low detection accuracy and thus needs to be corrected.

In this way, the segmentation neural network is trained with an ensured accuracy, thereby improving the accuracy of calculating the overhang of the battery.

S3, an object detection image of the battery to be detected is detected according to the segmentation network model to obtain the corresponding first binarized image.

Specifically, the battery to be detected is first photographed by using X-rays to obtain the object detection image of the battery to be detected. Then, the object detection image is input into the segmentation network model and detected through the segmentation network model to obtain the corresponding first binarized image. Channels of the model detection result are split to obtain a single-channel image of the positive electrode and a single-channel image of the negative electrode of the battery to be detected, that is, to obtain the first binarized image.

S4: the top coordinates of each of the positive electrode and the negative electrode of the battery to be detected are obtained according to the first binarized image.

S5: the overhang of the battery to be detected is calculated according to the top coordinates.

Specifically, after the first binarized image is obtained, that is, after the single-channel image of the positive electrode and the single-channel image of the negative electrode of the battery to be detected are obtained, threshold segmentation is performed on the single-channel image of the positive electrode and the single-channel image of the negative electrode, respectively, to obtain the top coordinates of each of the positive electrode and the negative electrode of the battery to be detected. Then, the overhang of the battery to be detected is calculated according to the top coordinates of each of the positive electrode and the negative electrode of the battery to be detected. In this way, the calculation method is greatly simplified while improving the calculation accuracy and versatility.

In summary, according to the deep learning-based method for calculating the overhang of the battery in an embodiment of the present invention, the training sample image set is obtained, and the neural network is trained according to the training sample image set to obtain the segmentation network model. Then, the object detection image of the battery to be detected is detected according to the segmentation network model to obtain the corresponding first binarized image. After that, the top coordinates of each of the positive electrode and the negative electrode of the battery to be detected are obtained according to the first binarized image, and the overhang of the battery to be detected is calculated according to the top coordinates. In this way, the calculation method is greatly simplified while improving the calculation accuracy and versatility.

Corresponding to the deep learning-based method for calculating the overhang of the battery in the foregoing embodiment, the present invention further provides a deep learning-based device for calculating an overhang of a battery.

Figure 2:
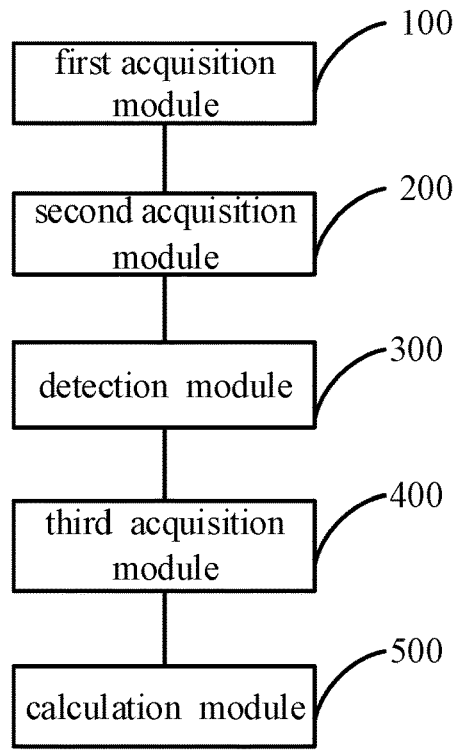
FIG. 2 is a schematic block diagram of a deep learning-based device for calculating an overhang of a battery according to an embodiment of the present invention.

As shown in FIG. 2, a deep learning-based device for calculating an overhang of a battery according to an embodiment of the present invention includes: the first acquisition module 100, the second acquisition module 200, the detection module 300, the third acquisition module 400, and the calculation module 500.

The first acquisition module 100 is configured to obtain a training sample image set. The second acquisition module 200 is configured to train a neural network according to the training sample image set to obtain a segmentation network model. The detection module 300 is configured to detect an object detection image of the battery to be detected according to the segmentation network model to obtain the corresponding first binarized image. The third acquisition module 400 is configured to obtain the top coordinates of each of the positive electrode and the negative electrode of the battery to be detected according to the first binarized image. The calculation module 500 is configured to calculate the overhang of the battery to be detected according to the top coordinates.

According to an embodiment of the present invention, the first acquisition module 100 is specifically configured to perform the following steps: photographing the battery by using X-rays to obtain a training sample image; labeling the positive electrode and the negative electrode of the battery in the training sample image to obtain a labeled image; and generating the training sample image set according to the training sample image and the corresponding labeled image.

According to an embodiment of the present invention, the second acquisition module 200 is specifically configured to perform the following steps: scaling the training sample image to a preset size; and training the neural network according to the scaled training sample image by using a gradient descent method to obtain the segmentation network model.

According to an embodiment of the present invention, the second acquisition module 200 is further configured to perform the following steps: detecting the training sample image according to the segmentation network model to obtain the corresponding second binarized image; comparing the second binarized image with the labeled image; and correcting the segmentation network model according to the comparison result.

It should be noted that, the more specific implementation of the deep learning-based device for calculating the overhang of the battery in the embodiment of the present invention can refer to the foregoing embodiment of the deep learning-based method for calculating the overhang of the battery, and thus will not be repeated herein.

According to the deep learning-based device for calculating the overhang of the battery in the embodiment of the present invention, the training sample image set is obtained through the first acquisition module, and the neural network is trained according to the training sample image set through the second acquisition module to obtain the segmentation network model. Then, the object detection image of the battery to be detected is detected according to the segmentation network model through the detection module to obtain the corresponding first binarized image. After that, the top coordinates of each of the positive electrode and the negative electrode of the battery to be detected are obtained according to the first binarized image through the third acquisition module, and the overhang of the battery to be detected is calculated according to the top coordinates through the calculation module. In this way, the calculation method is greatly simplified while improving the calculation accuracy and versatility.

Corresponding to the foregoing embodiment, the present invention further provides a computer device.

According to an embodiment of the present invention, the computer device includes a memory, a processor, and a computer program stored in the memory and configured to run on the processor. The processor executes the computer program to implement the deep learning-based method for calculating the overhang of the battery in the foregoing embodiment.

The computer device according to the embodiment of the present invention not only greatly simplifies the calculation method, but also improves the calculation accuracy and versatility.

Corresponding to the foregoing embodiment, the present invention further provides a non-transitory computer-readable storage medium.

According to an embodiment of the present invention, a non-transitory computer-readable storage medium is provided, and a computer program is stored in the non-transitory computer-readable storage medium. The program is executed by a processor to implement the deep learning-based method for calculating the overhang of the battery described above.

The non-transitory computer-readable storage medium according to the embodiment of the present invention not only greatly simplifies the calculation method, but also improves the calculation accuracy and versatility.

In the description of the present invention, the terms "first", "second" and the like are only used for descriptive purposes, and cannot be understood as indicating or implying relative importance or implicitly indicating the number of technical features referred. Thus, features defined with "first", "second" and the like may explicitly or implicitly include one or more of such features. The meaning of "a plurality of" is two or more than two, unless otherwise specifically defined.

In the present invention, unless otherwise clearly defined and limited, the terms "install/mount", "connected to", "connection", "fixed" and the like should be understood in a broad sense. For example, the term "connection" may be a fixed connection, a detachable connection, or an integral connection. It may be a mechanical connection or an electrical connection. It may be a direct connection, an indirect connection through an intermediate medium, a communication between two elements, or an interaction relationship between two elements. For those of ordinary skill in the art, the specific meaning of the above-mentioned terms in the present invention can be understood according to specific situations.

In the present invention, unless expressly stipulated and defined otherwise, the expression that the first feature is located "on" or "below/under" the second feature means the first feature directly contacts the second feature, or the first feature indirectly contacts the second feature through an intermediate medium. Moreover, the expression that the first feature is located "on", "above" and "over" the second feature means the first feature is located directly above or diagonally above the second feature, or merely means that a level of the first feature is higher than that of the second feature. The expression that the first feature is located "beneath", "below" and "under" the second feature means the first feature is located directly below or diagonally below the second feature, or merely means that a level of the first feature is lower than that of the second feature.

In the description of the specification, the description with reference to the terms "an/one embodiment", "some embodiments", "examples", "specific examples", or "some examples" and the like means the specific features, structures, materials or characteristics described with reference to the embodiment or example are included in at least one embodiment or example of the present invention. In this specification, the schematic expression of the above-mentioned terms does not necessarily refer to an identical embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification in case of no conflict.

Any process or method described in the flow chart or described in other ways herein can be understood as a module, segment or part of code that includes one or more executable instructions for implementing specific logical functions or steps of the process. In addition, the scope of the preferred embodiments of the present invention includes additional implementations, in which the functions may be executed in a substantially simultaneous manner or in the reverse order according to the functions involved without necessarily following the order shown or discussed. This should be understood by those skilled in the art to which the embodiments of the present invention belong.

The logic and/or steps represented in the flow chart or described in other ways herein, for example, may be considered as a sequenced list of executable instructions for implementing logic functions. They may be specifically implemented in any computer-readable medium for use by an instruction execution system, device or equipment (such as computer-based systems, processor-containing systems, or other systems that can call and execute instructions from the instruction execution system, device, or equipment). They may be used in combination with the instruction execution system, device or equipment. For the purposes of this specification, a "computer-readable medium" may be any device that can contain, store, communicate, propagate, or transmit a program for use by an instruction execution system, device, equipment, or an apparatus combining the instruction execution system, device, or equipment. More specific examples (non-exhaustive list) of a computer-readable medium include the following: electrical connection part (electronic device) with one or more wiring, portable computer disk case (magnetic device), random access memory (RAM), read-only memory (ROM), electrically programmable read-only memory (EPROM) or flash memory, optical fiber device, and portable compact disc read-only memory (CDROM). In addition, the computer-readable medium may even be paper or other suitable medium on which the program can be printed. This is because the program can be obtained electronically by, for example, optically scanning paper or other medium, then editing, decoding, or processing in other suitable ways if necessary, and then storing the program in a computer memory.

It should be understood that each module of the present invention can be implemented by hardware, software, firmware or a combination thereof. In the above embodiments, multiple steps or methods can be implemented by software or firmware stored in a memory and executed by a suitable instruction execution system. For example, if it is implemented by hardware, then, as in another embodiment, it can be implemented by any one or a combination of the following technologies known in the art: a discrete logic circuit with logic gates for realizing logic functions on data signals, an application-specific integrated circuit with suitable combinational logic gates, a programmable gate array (PGA), a field-programmable gate array (FPGA), and others.

Those of ordinary skill in the art can understand that all or part of the steps carried in the method of the foregoing embodiments can be completed by instructing relevant hardware through a program. The program may be stored in a computer-readable storage medium, and the program is executed to implement one of the steps of the embodiment of the method or a combination thereof.

In addition, various functional units in the various embodiments of the present invention can be integrated into one processing module, or each unit exists alone physically, or two or more units are integrated into one module. The above-mentioned integrated modules can be implemented in the form of a hardware or a software functional module. If the integrated module is implemented in the form of a software functional module and sold or used as an independent product, it can also be stored in a computer-readable storage medium.

The aforementioned storage medium may be a read-only memory, a magnetic disk, an optical disk, or the like. Although the embodiments of the present invention have been shown and described above, it can be understood that the foregoing embodiments are exemplary and should not be construed as limiting the present invention. Those of ordinary skill in the art may make changes, modifications, substitutions and variations to the foregoing embodiments without departing the present invention, and those changes, modifications, substitutions and variations shall fall within the scope of protection of the present invention.

What is claimed is:

1. A deep learning-based method for calculating an overhang of a battery, comprising the following steps:
    obtaining a training sample image set;
    training a neural network according to the training sample image set to obtain a segmentation network model;
    detecting an object detection image of the battery to be detected according to the segmentation network model to obtain a first binarized image corresponding to the object detection image;
    obtaining top coordinates of each of a positive electrode and a negative electrode of the battery to be detected according to the first binarized image; and
    calculating the overhang of the battery to be detected according to the top coordinates.

2. The deep learning-based method according to claim 1, wherein
    the step of obtaining the training sample image set comprises:
    photographing the battery by using X-rays to obtain a training sample image;
    labeling the positive electrode and the negative electrode of the battery in the training sample image to obtain a labeled image; and
    generating the training sample image set according to the training sample image and the labeled image corresponding to the training sample image.

3. The deep learning-based method according to claim 2, wherein
    the step of training the neural network according to the training sample image set to obtain the segmentation network model comprises:
    scaling the training sample image to a preset size to obtain a scaled training sample image; and
    training, according to the scaled training sample image, the neural network by using a gradient descent method to obtain the segmentation network model.

4. The deep learning-based method according to claim 3, wherein the step of training the neural network according to the training sample image set to obtain the segmentation network model further comprises:
detecting the training sample image according to the segmentation network model to obtain a second binarized image corresponding to the training sample image;
comparing the second binarized image with the labeled image to obtain a comparison result; and
correcting the segmentation network model according to the comparison result.

5. A deep learning-based device for calculating an overhang of a battery, comprising:
a first acquisition module,
a second acquisition module,
a detection module,
a third acquisition module, and
a calculation module;
wherein
the first acquisition module is configured to obtain a training sample image set;
the second acquisition module is configured to train a neural network according to the training sample image set to obtain a segmentation network model;
the detection module is configured to detect an object detection image of the battery to be detected according to the segmentation network model to obtain a first binarized image corresponding to the object detection image;
the third acquisition module is configured to obtain top coordinates of each of a positive electrode and a negative electrode of the battery to be detected according to the first binarized image; and
the calculation module is configured to calculate the overhang of the battery to be detected according to the top coordinates.

6. A computer device, comprising:
a memory,
a processor, and
a computer program stored in the memory and configured to run on the processor;
wherein
the processor executes the computer program to implement the deep learning-based method according to claim 1.

7. A non-transitory computer-readable storage medium, wherein
a computer program is stored in the non-transitory computer-readable storage medium, and the computer program is executed by a processor to implement the deep learning-based method according to claim 1.

8. The computer device according to claim 6, wherein
the step of obtaining the training sample image set comprises:
photographing the battery by using X-rays to obtain a training sample image;
labeling the positive electrode and the negative electrode of the battery in the training sample image to obtain a labeled image; and
generating the training sample image set according to the training sample image and the labeled image corresponding to the training sample image.

9. The computer device according to claim 8, wherein
the step of training the neural network according to the training sample image set to obtain the segmentation network model comprises:
scaling the training sample image to a preset size to obtain a scaled training sample image; and
training, according to the scaled training sample image, the neural network by using a gradient descent method to obtain the segmentation network model.

10. The computer device according to claim 9, wherein
the step of training the neural network according to the training sample image set to obtain the segmentation network model further comprises:
detecting the training sample image according to the segmentation network model to obtain a second binarized image corresponding to the training sample image;
comparing the second binarized image with the labeled image to obtain a comparison result; and
correcting the segmentation network model according to the comparison result.

11. The non-transitory computer-readable storage medium according to claim 7, wherein
the step of obtaining the training sample image set comprises:
photographing the battery by using X-rays to obtain a training sample image;
labeling the positive electrode and the negative electrode of the battery in the training sample image to obtain a labeled image; and
generating the training sample image set according to the training sample image and the labeled image corresponding to the training sample image.

12. The non-transitory computer-readable storage medium according to claim 11, wherein
the step of training the neural network according to the training sample image set to obtain the segmentation network model comprises:
scaling the training sample image to a preset size to obtain a scaled training sample image; and
training, according to the scaled training sample image, the neural network by using a gradient descent method to obtain the segmentation network model.

13. The non-transitory computer-readable storage medium according to claim 12, wherein
the step of training the neural network according to the training sample image set to obtain the segmentation network model further comprises:
detecting the training sample image according to the segmentation network model to obtain a second binarized image corresponding to the training sample image;
comparing the second binarized image with the labeled image to obtain a comparison result; and
correcting the segmentation network model according to the comparison result.

* * * * *